United States Patent
Hughes et al.

(10) Patent No.: US 7,571,285 B2
(45) Date of Patent: Aug. 4, 2009

(54) DATA CLASSIFICATION IN SHARED CACHE OF MULTIPLE-CORE PROCESSOR

(75) Inventors: Christopher J. Hughes, San Jose, CA (US); Yen-Kuang Chen, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 308 days.

(21) Appl. No.: 11/491,043

(22) Filed: Jul. 21, 2006

(65) Prior Publication Data

US 2008/0022049 A1    Jan. 24, 2008

(51) Int. Cl.
*G06F 12/00*  (2006.01)
(52) U.S. Cl. .................. 711/130; 711/141; 711/144
(58) Field of Classification Search .................. None
See application file for complete search history.

(56) References Cited

U.S. PATENT DOCUMENTS

| 5,241,664 | A * | 8/1993 | Ohba et al. ............ 711/121 |
| 2002/0065992 | A1* | 5/2002 | Chauvel et al. .......... 711/141 |
| 2005/0132140 | A1* | 6/2005 | Burger et al. ........... 711/128 |
| 2006/0143384 | A1 | 6/2006 | Hughes et al. |

OTHER PUBLICATIONS

U.S. Appl. No. 11/320,788, filed Dec. 30, 2005, entitled "Method and System For Proximity Caching In A Multiple-Core System" by Yen-Kuang Chen and Christopher J. Hughes.
Kattamuri Edanadham, Beng-Hong Lim, Pratap Pattnaik and Marc Snir, "PRISM: An Integrated Architecture for Scalable Shared Memory," 1998, pp. 1-12.
Changkyu Kim, Doug Burger and Stephen W. Keckler, "An Adaptive, Non-Uniform Cache Structure for Wire-Delay Dominated On-Chip Caches," 2002, pp. 1-12.
Bradford M. Beckmann and David A. Wood, "Managing Wire Delay in Large Chip-Multiprocessor Caches," 2004, pp. 1-12.
Michael Zhang and Krste Asanović, "Victim Replication: Maximizing Capacity While Hiding Wire Delay in Tiled Chip Multiprocessors," Jun. 2005, pp. 1-10.
Jichuan Chang and Gurindar S. Sohi, "Cooperative Caching For Chip Multiprocessors," Jun. 17, 2006, pp. 1-12.

* cited by examiner

*Primary Examiner*—Than Nguyen
(74) *Attorney, Agent, or Firm*—Trop, Pruner & Hu, P.C.

(57) ABSTRACT

In one embodiment, the present invention includes a method for determining if a state of data is indicative of a first class of data, re-classifying the data from a second class to the first class based on the determination, and moving the data to a first portion of a shared cache associated with a first requester unit based on the re-classification. Other embodiments are described and claimed.

18 Claims, 4 Drawing Sheets

DATA CLASSIFICATION IN SHARED CACHE OF MULTIPLE-CORE PROCESSOR

BACKGROUND

In multi-core processors or other processing systems, each core may have an associated cache memory, i.e., a private cache accessible only by that core. Furthermore, a shared cache memory, accessible to all of the cores, may be provided to extend cache capacity. Cache access time can be affected by propagation delays present in electrical circuitry. In general, cache access time may increase in proportion to such physical properties as the distance between the cache and an accessing logic, the width of a data interconnect, and so forth.

The optimal cache design for a multi-core architecture is a current research issue, and one of the most basic questions is whether a large cache should be organized into a single (e.g., banked) shared cache, or into private caches for the cores. A shared last-level cache can perform poorly when the private data of each thread's working set exceeds a core's private cache and data has to be repeatedly re-fetched from a remote piece of the shared cache. A private last-level cache can perform poorly when threads share most of their working sets. Thus an optimal choice depends on the total amount of cache capacity, an application's working set size, and the application's data sharing patterns. Both shared and private access patterns are expected to occur in future recognition, data mining, and synthesis (RMS) applications, as an example.

DETAILED DESCRIPTION

Embodiments relate to processor-based systems, and more particularly to such systems including cache memory.

Embodiments of the present invention may be used to dynamically classify/re-classify data in a shared cache to effect differing location policies. In this way, an adaptive last-level cache (LLC) such as may be used in connection with a chip multiprocessor can be a hybrid of a private and shared cache. That is, while the cache may be a shared, segmented last-level cache, it can automatically detect if data is private and use at least some of its storage as private cache. In this way, data that is accessed by only one core at a time may be placed near that core, reducing average travel distance of memory accesses, which in turn reduces on-die interconnect traffic and thus reduces energy consumption and improves performance.

Thus in various embodiments, a scalable cache architecture may adapt itself to application needs. Based on state information associated with given data (e.g., cache line state), it may be determined if a line in the LLC would likely benefit from being treated as private (e.g., the line is being repeatedly accessed by a single core). Based on this determination, the cache line may be classified as private and moved to the bank of the LLC closest to the core that is using it. Future accesses to this "private" data by another core may trigger movement of the data to the bank closest to that new core. As will be described further below, embodiments may use state information associated with cache lines to detect if "private" data would benefit from being re-classified as shared (e.g., if it is being moved too often). The combination of these mechanisms allows the classification of data to change during program execution as an application goes from one phase to another (e.g., a serial region in which the data may be classified as "private," to a parallel region in which the data may be classified as "shared"). In this way, at least portions of a shared cache may be automatically reconfigured to act as an extension of a core's private cache.

Figure 1:
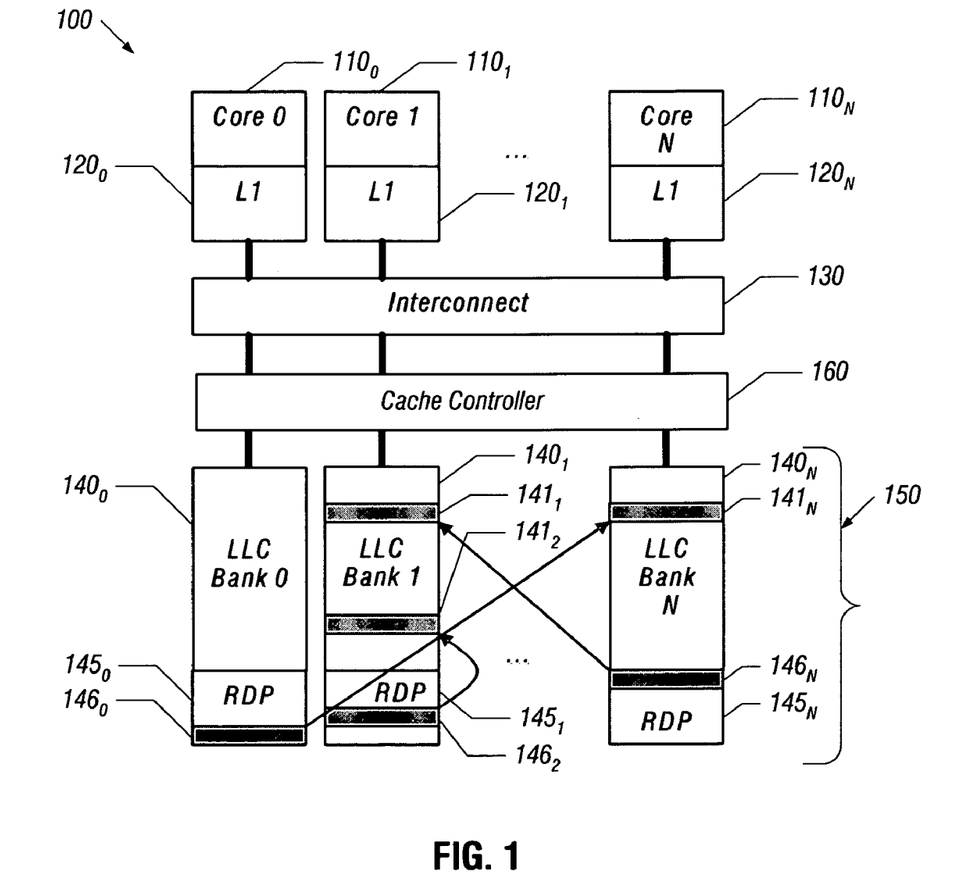
FIG. 1 is a block diagram of a processor in accordance with an embodiment of the present invention.

Referring now to FIG. 1, shown is a block diagram of a processor in accordance with an embodiment of the present invention. As shown in FIG. 1, processor 100 includes multiple cores, namely cores $110_0$-$110_N$ (generically core 110). Each core 110 may have a corresponding private level one (L1) cache, namely private caches $120_0$-$120_N$ (generically private cache 120). Note that while only a single level of private cache is shown in the embodiment of FIG. 1, the scope of the present invention is not limited in this regard and in other embodiments multiple levels of private caches may be present. In many embodiments, it may be assumed that all portions of processor 100 shown in FIG. 1 are part of a single substrate, although the scope of the present invention is not so limited.

Still referring to FIG. 1, an interconnect 130 couples cores 110 and their corresponding private caches 120 to a shared cache 150, also referred to herein as a last level cache (LLC), via a cache controller 160 of shared cache 150. Note that while described as a banked embodiment, in other implementations shared cache 150 may be segmented in another manner. For ease of discussion, the terms LLC and shared cache may be used interchangeably, although in many embodiments multiple levels of shared caches may be present. In the embodiment of FIG. 1, shared cache 150 may be segmented into multiple banks, namely banks $140_0$-$140_N$ (generically bank 140). As shown in FIG. 1, physically each bank 140 may be located closest to a given one of cores 110. Thus physically there is a different distance between each bank 140 and each core 110. Accordingly, each core 110 has a single bank 140 that is closest to it. As will be described further below, in various embodiments at least certain data closely associated with a given core may be stored in the bank 140 closest to it. Typically, data associated with a given address exists in a single bank of shared cache 150. That is, generally a single copy of the data exists in shared cache 150. Generally, an address hashing function may be used to determine where a given piece of data is to be stored within shared cache 150.

In various embodiments, data stored in locations (i.e., cache lines) of shared cache 150 may be classified as roaming or non-roaming. Designation of data as roaming or non-roaming may correspond to a location protocol that is used to determine in which bank or other portion of shared cache 150 that the corresponding cache line is to be stored. That is, multiple location protocols may be used to store data, depending on the data type. Non-roaming data may be stored according to an address hash function. In other words, this location protocol corresponds to a protocol favoring shared data, where the hash function dictates in which bank the data is to be stored. However, roaming data may be stored in the bank 140 that is closest to the last one of cores 110 to use the data corresponding to the address or cache line. In other words, this location protocol corresponds to a protocol favoring private data, where the proximity of the bank to the using core dictates location. That is, although a single copy of any roaming cache line may exist in shared cache 150 at any given point in time, the cache line may be stored in any one of banks 140, depending on which one of cores 110 last touched the cache line. In many implementations, each cache line may include an indicator (i.e., a roaming indicator) to indicate whether a given cache line is roaming. In one embodiment, a roaming flag (i.e., an R bit) may be present to indicate roaming status. Data classified as roaming may be classified in this way based on a usage pattern of the data. That is, roaming data may move amongst banks when a usage pattern indicates that a given core (i.e., a core closest to a bank in which the roaming data is located) is likely to repeatedly access the roaming data to the exclusion of other cores. In contrast, data may be classified as non-roaming when usage patterns indicate that the data is likely to be next accessed by any given one of the cores.

To further effect handling of roaming data, each bank 140 may include a roaming data pointer (RDP) structure $145_0$-$145_N$ (generically RDP 145). RDP's 145 may act as a mechanism to locate roaming data. In one embodiment, each RDP 145 includes a plurality of storage locations or entries $146_0$-$146_N$ (generically entry 146), each corresponding to a roaming cache line. For example, with reference to FIG. 1, entry $146_0$ is used to point to an entry $141_N$ in bank $140_N$. Similarly, entry $146_2$ is used to point to an entry $141_2$ in bank $140_1$. Further, entry $146_N$ is used to point an entry $141_1$, also in bank $140_1$. Each entry 146 may include various information to indicate the status and location of the corresponding roaming cache line. Specifically, in one embodiment each entry 146 may include a valid indicator, an address tag, and an identifier corresponding to the given bank 140 that includes the roaming cache line. Of course, additional and/or different information may be present in other embodiments. Using this information, a requester may be able to search for and locate requested roaming data. In the implementations described herein, it may be assumed that RDPs 145 use the same address hashing function that is used for non-roaming data in the shared cache 150, although the scope of the present invention is not limited in this regard. Furthermore, in other embodiments RDPs 145 may be located in different hardware structures than banks 140.

In some embodiments, inclusion between private caches 120 and shared cache 150 may be accommodated such that shared cache 150 is inclusive of all data present in private caches 120. However, other embodiments may be used in connection with a directory-inclusion scheme in which a shared cache includes information to identify the location of data in an L1 cache. Note that while described with this high-level implementation in the embodiment of FIG. 1, it is to be understood that a processor in accordance with an embodiment of the present invention can include many other features and may be differently configured.

To effect classification, location, movement, and searching of data within a cache hierarchy, various hardware and software mechanisms may be present. In many implementations, hardware such as cache controller 160 may be present in or associated with shared cache 150 to enable identification and control of roaming data. In various embodiments, cache controller 160 may automatically determine whether data in shared cache 150 should be classified as roaming or non-roaming, e.g., based on state information associated with the data. In various applications, during different phases of operation, a given piece of data may be accessed in different manners. For example, a given piece of data may be accessed in a shared manner in certain application phases, yet accessed in a private manner in other phases. Accordingly, embodiments may be used to dynamically re-classify non-roaming data as roaming data, and vice versa.

Referring now to Table 1 below, shown is a listing of state fields or segments present in a shared cache entry in accordance with an embodiment of the present invention.

TABLE 1

| State | Tag | Data | Sharing vector | Owner | Roam Flag | Reuse counter | Core Counter |
|---|---|---|---|---|---|---|---|

Specifically, the fields present include a state field, which may include indicators that correspond to a given cache coherence protocol, such as a mutual, exclusive, shared, and invalid (MESI) or a mutual, shared, and invalid (MSI) protocol. Other fields include a tag field and a data field that includes the data of a given cache line. A sharing vector field may include information to identify each core that includes a copy of the line in its private cache. An owner field is used to identify an owner (core with exclusive permission) of the line. A roam flag or indicator is used to indicate that the corresponding cache line is in a roaming state. A reuse counter field may correspond to a count of a number of times in a row that a given core accesses the data, when the cache line has been classified as roaming. In various embodiments the reuse counter field may correspond to a saturating counter which saturates at a given number N of consecutive accesses by a given core. In some embodiments, additionally a core counter field may be present to track the number of cores that have touched the cache line. Note that this field may be reset when any core touches the line a sufficient number of times in a row (i.e., if the reuse counter field hits its maximum value). While shown with these particular state fields in Table 1, it is to be understood the scope of the present invention is not limited in this regard.

On an L1 miss, if the requested data is found in the LLC and is non-roaming according to the roaming indicator, the state of the cache line, including for example, the cache coherency state and sharing state of the line (e.g., sharing vector and owner fields) may be examined to determine if the current requester (e.g., given L1 cache) is the same as the requester that touched the data last. More specifically, if the line is in a read-only state (i.e., no L1 cache currently has permission to write the line), it may be determined whether there is only one reader and if that reader is the requesting L1 cache (e.g., according to the sharing vector field). This case can arise because in some embodiments, L1 caches do not notify the last-level cache if they evict a line in a read-only state. If none of the L1 caches are known to have the line, it may next be determined if the requesting L1 cache was the last one to have the line. If either of the above conditions holds, this is a strong indicator that the data is private, exhibits temporal locality, but does not fit in the requesting L1 cache. Thus, this data may benefit from being treated as private, and may be re-classified as roaming. Note that when data is re-classified as roaming, it is moved from its conventional location in the shared cache to the bank closest to the L1 cache that just requested it, and the roam flag field is set.

Figure 2:
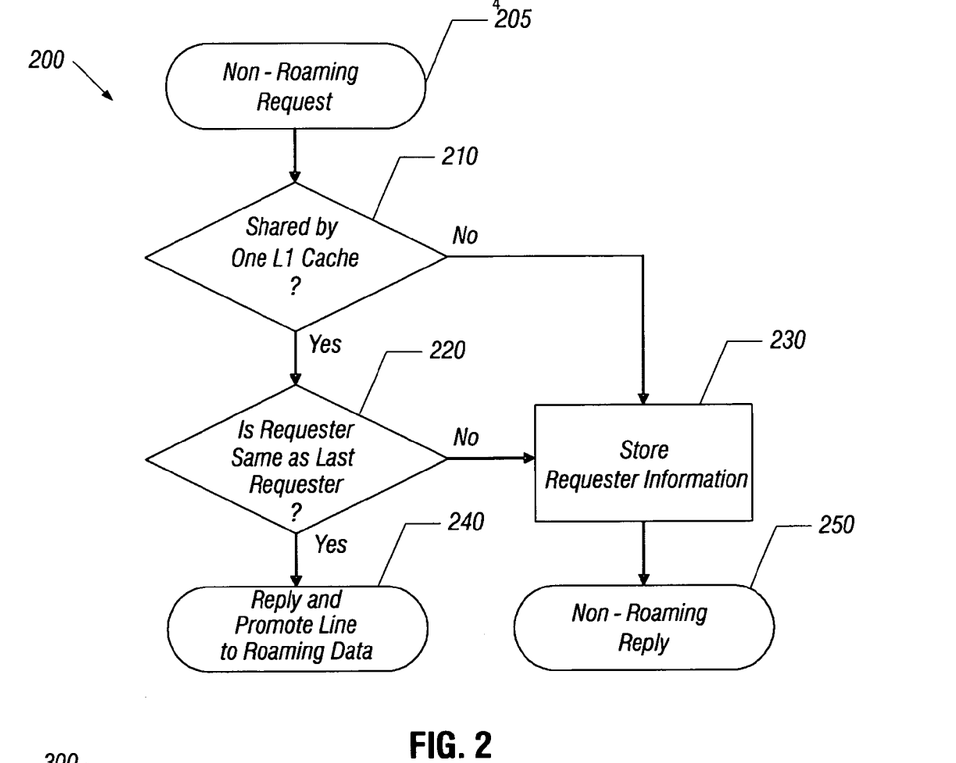
FIG. 2 is a flow diagram of a method in accordance with one embodiment of the present invention.

Referring now to FIG. 2, shown is a flow diagram of a method in accordance with one embodiment of the present invention. Specifically, method 200 may be used to determine if data being requested by a given core should be re-classified as roaming data. In some implementations, method 200 may be performed by a cache controller of a shared cache such as an LLC. Method 200 may begin by receiving a request for data that is in the last-level cache and is currently non-roaming (block 205). Such a request may come from a given processor core (via its L1 cache) that requests a cache line from a shared cache (i.e., the requested cache line is not present in the private cache associated with the core). While described as a core that requests data from a shared cache, the scope of the present invention is not so limited. That is, in many embodiments other agents of a system may request data from a shared cache. Referring still to FIG. 2, control passes to diamond 210, where it may be determined whether the cache line requested is shared by at most a single L1 cache. In some embodiments, this may be determined by analysis of state information, e.g., in a sharing vector field. If the line is shared by multiple caches, control passes to block 230, where information regarding the requester may be stored, e.g., in the sharing vector field of the cache line (block 230). Further, a non-roaming reply may be generated (block 250).

Referring still to FIG. 2, if it is determined that the cache line is shared by at most a single L1 cache, control passes to diamond 220. There, it may be determined whether the current requester is the same as the previous requester (diamond 220). For example, this determination may be performed by a comparison between the current requester and a previous requester's identifier in a sharing vector field of the cache line. If the request is from a previous requester, control passes to block 230, discussed above. If instead it is determined that the current requester is the same as the immediate prior requester, control passes to block 240.

At block 240 a reply may be sent that provides the data to the requester. Furthermore, the cache line may be promoted to roaming state. That is, a roaming indicator in a state field of the cache line may be set to indicate the status of the cache line as including roaming data. While not shown in the flow diagram of FIG. 2, it is to be understood that when a given cache line is promoted to roaming status, the cache line may be moved from a current shared cache location to a bank or other portion of the shared cache closest to the requesting core. In this way, improved access times and reduced power consumption may be realized when the requesting core seeks the data again.

Figure 3:
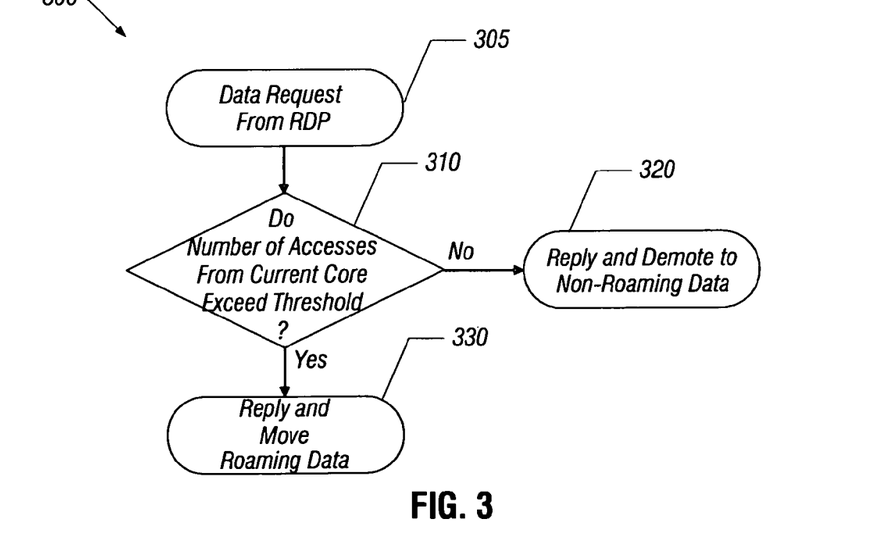
FIG. 3 is a flow diagram of a method for re-classifying data in accordance with an embodiment of the present invention.

Note that in various implementations all data may be classified as non-roaming by default. That is, on a shared cache miss, data is brought into the cache as non-roaming (i.e., the roaming flag field is cleared), and the data is brought into a given bank according to, e.g., an address hash function. As described above, during execution of an application, different phases may access the data differently. Accordingly, in various embodiments methods may be present to determine if data that is classified as roaming data should instead be re-classified as non-roaming data. Referring now to FIG. 3, shown is a flow diagram of a method for re-classifying data in accordance with an embodiment of the present invention. As shown in FIG. 3, method 300 (which may be performed by a cache controller, in some embodiments) may begin by receiving a request from an RDP (block 305). Note that such a request comes from the RDP that includes an entry that points to a bank including the requested roaming cache line. As shown in FIG. 3, from block 305 control passes to diamond 310. There, it may be determined whether a number of accesses from a current owner core (i.e., the core associated with the bank including the roaming data) exceeds a threshold (diamond 310). In various embodiments, the determination made in diamond 310 may be done by accessing a reuse counter field of the cache line, which acts as a saturating counter to track the number of times in a row that a given cache line is accessed by the same core. If the counter has reached its threshold, a reply message may be sent in which the data's status remains as roaming and it is moved from its current location to a new bank, i.e., a bank closest to the currently requesting core (block 330). While not shown in FIG. 3, the RDP including a pointer for this line may be updated accordingly.

Referring still to FIG. 3, if instead at diamond 310 it is determined that the number of accesses by the current owner core does not exceed the threshold, control passes to block 320. There a reply message may be sent to the requesting core with the data (block 320). Furthermore, the cache line may be re-classified as non-roaming data. That is, if the request is by another core before the reuse counter saturates (i.e., meets the threshold), the data may benefit from re-classification as non-roaming status. Accordingly, the roaming field flag may be reset to indicate that the line includes non-roaming data. Note that in some embodiments, when data is re-classified as non-roaming, the cache line may be moved from its current bank to another bank as determined by an address hashing function, although the scope of the present invention is not so limited. Furthermore, an RDP entry for the cache line may be deallocated when it is re-classified as non-roaming. Accordingly, method 300 may be used to detect if roaming data is no longer being accessed in a private manner.

An alternate embodiment for detecting if roaming data is no longer being accessed in a private manner is to use the reuse counter field and implement an additional counter per cache line (i.e., the core counter field). The core counter field may be used to track the number of cores that have touched the cache line. However this counter may be reset when any core touches the line enough times in a row (i.e., if the reuse counter hits its threshold value). If the core counter overflows, the data may be re-classified as non-roaming. Note that this embodiment is more conservative about re-classifying data as non-roaming, but uses an additional counter per cache line as well as additional control logic. The selection of one of these approaches may depend on hardware cost and target application behavior.

Figure 4:
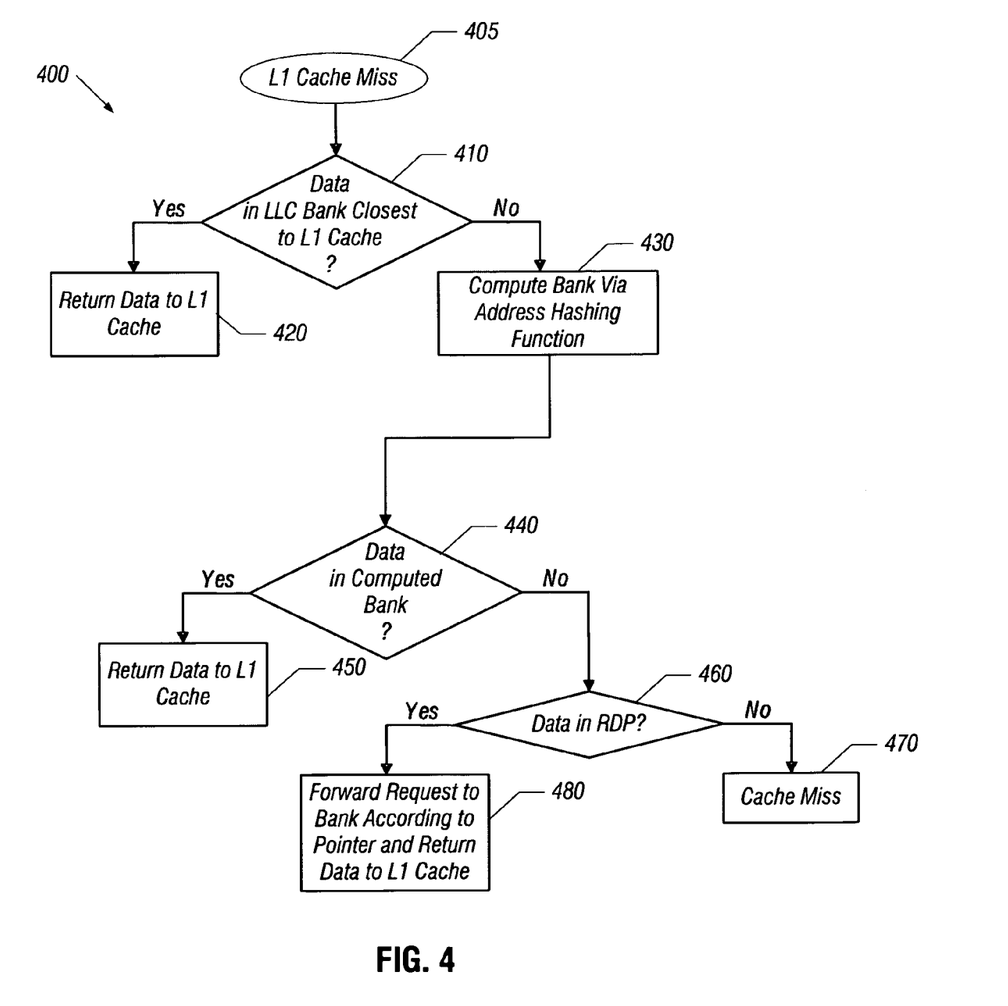
FIG. 4 is a flow diagram of a search policy technique in accordance with one embodiment of the present invention.

When data is classified as roaming, it may be stored in a different cache location (e.g., a different bank) than the bank that it would be stored in according to a given cache location scheme such as an address hashing function. Accordingly, embodiments may provide policies for data searching to maximize the benefits of reduced searching costs for roaming data in a shared cache in accordance with an embodiment of the present invention. Referring to FIG. 4, shown is a flow diagram of a search policy technique in accordance with one embodiment of the present invention. As shown in FIG. 4, method 400 may begin on an L1 cache miss (block 405). That is, method 400 may be initiated when data requested by a given core is not present in a private cache associated with the core. In such circumstances, control passes from block 405 to diamond 410. At diamond 410, it may be determined whether the data is present in the last level cache bank closest to the L1 cache (and requesting core). If so, control passes to block 420, where the data is returned to the L1 cache. Note that this search and access corresponds to a cache hit for data in the closest LLC bank to the requesting core. Diamond 410 and block 420 thus act as the fastest path for shared cache hits.

Referring still to FIG. 4, if it is determined instead at diamond 410 that the data is not present in the closest cache bank, it may be determined in which bank the data is present (block 430). In some implementations, the bank may be determined by computing an address hashing function, which provides an indication of the bank in which the data would be stored. From block 430, control passes to diamond 440. There, it may be determined if the data is present in the computed bank (diamond 440). If so, a cache hit occurs and data may be returned to the L1 cache (block 450). If not, control passes from diamond 440 to diamond 460. There, it may be determined whether an entry exists in the RDP associated with the computed bank for the data (diamond 460). Note that in some embodiments, the determinations of diamonds 440 and 460 may be performed in parallel. If an entry is present in the RDP, the information in the entry may be used to forward a request to the given bank that includes the data and when accessed, the data may be returned to the L1 cache associated with the requesting core (block 480). If instead at diamond 460 it is determined that there is no entry present in the RDP for the requested data, a cache miss occurs (block 470). Accordingly, various mechanisms to request the missing data from lower levels of a memory hierarchy, such as a more remote cache, system memory or other location may be performed. While described with this particular implementation in the embodiment of FIG. 4, it is to be understood that the scope of the present invention is not limited in this regard.

For example, an alternate search policy may be to search the bank according to the address hashing function first. However, this can greatly reduce the latency and energy benefits of roaming data. Still further implementations may use a hardware predictor (e.g., bloom-filter or partial tag) to determine whether to check the local bank first or the conventional bank first.

Note that in certain applications, e.g., RMS workloads, shared data is almost always shared by all threads. Therefore, a binary classification scheme (i.e., roaming or non-roaming) may be used. However, in other implementations, a scheme that attempts to capture sharing by a subset of threads may be used.

Note that when a line is re-classified as roaming and moved to the closest bank, this may trigger an eviction of another cache line. If the evicted line is non-roaming, it may be evicted conventionally. If the evicted line is roaming, it may be re-classified as non-roaming. Then, the line may be attempted to be moved back to a bank according to an address hashing function. Note that without this scheme, each thread would be limited in how much roaming data it could have in the shared cache at any one time (i.e., one bank's worth). If only a small set of threads is actively using the shared cache, this may be wasteful. Thus embodiments allow each thread in the system to potentially use the entire shared cache, even for roaming data (although data outside the closest bank may be classified as non-roaming). When attempting to move data back to another bank, this might trigger an eviction of another line. In one embodiment, a typical replacement policy may be used to choose the victim, and if the victim is roaming, it is evicted from the chip (i.e., it is not re-classified as non-roaming). In another embodiment, re-classification of a roaming line to non-roaming is not allowed to trigger an eviction of a roaming line. Instead, if the only potential victims are roaming lines, the move fails and the data that was re-classified is evicted.

Thus in various embodiments, fast searching for roaming data may be realized. Because in many applications, a significant amount of data will be classified as roaming, many shared cache hits will be to the bank closest to the requesting core and reduce average memory latency. These hits will be fast and consume little energy since the requests only need to travel a short physical distance through an on-die interconnect. Further, these requests also consume little on-die interconnect bandwidth, making a system more scalable in terms of number of cores.

Further embodiments of the present invention may adapt to an application's memory access behavior. That is, dynamic detection as to whether each piece of data is currently exhibiting properties of private or shared data occurs with different policies provided for each data class. In other words, embodiments may automatically classify the data as shared or private, and allow this classification to change over time without any programmer effort, compiler changes, or instruction set architecture support. Further still, there is no need to keep multiple copies of data in the shared cache, maximizing the amount of usable cache space. Embodiments thus dynamically classify and re-classify data without the need for programmer feedback, duplicating data in the last-level cache, or requiring classification of entire pages in the same way, i.e., private or shared.

Figure 5:
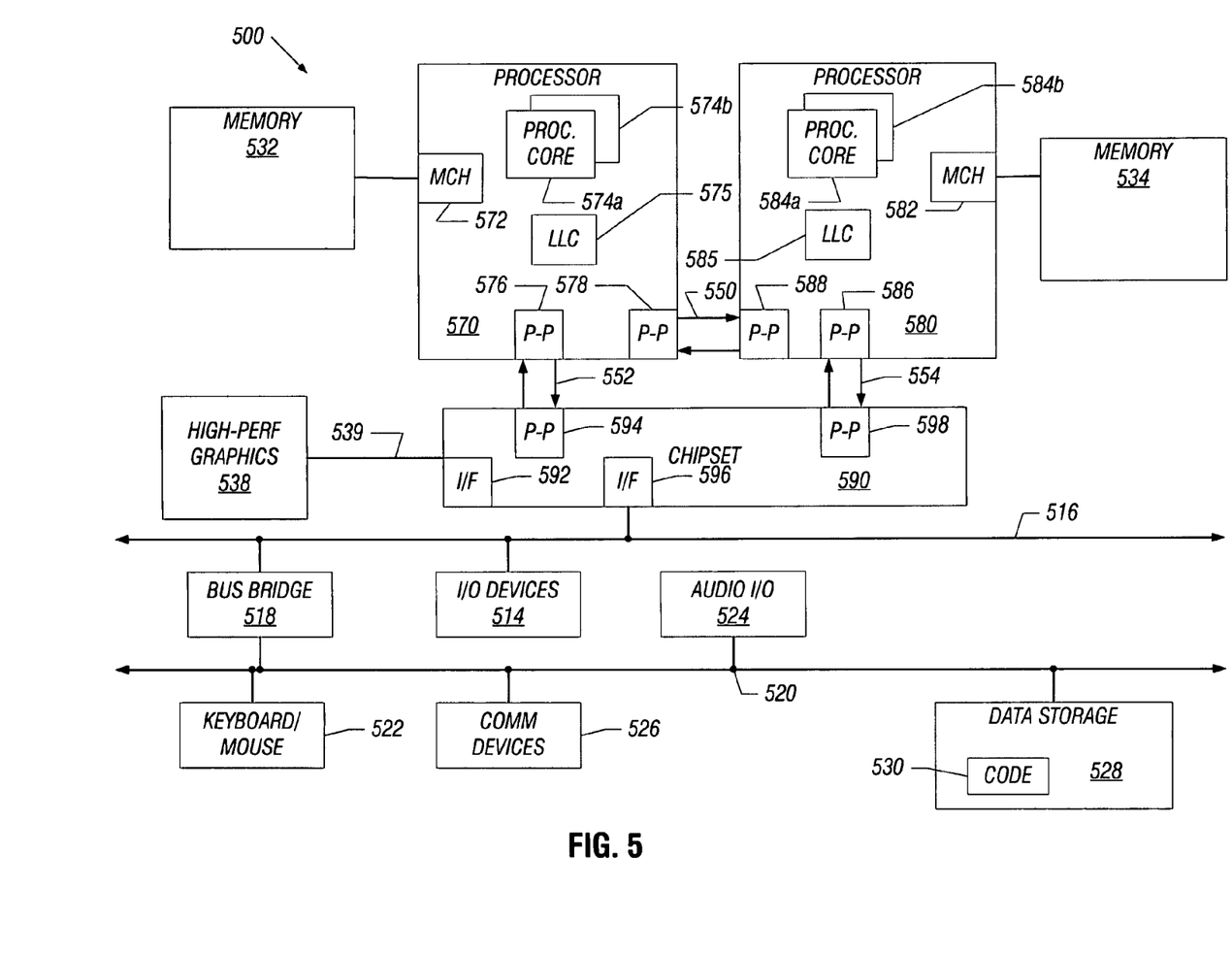
FIG. 5 is a block diagram of a system in accordance with one embodiment of the present invention.

Embodiments may be implemented in many different system types. Referring now to FIG. 5, shown is a block diagram of a system in accordance with an embodiment of the present invention. As shown in FIG. 5, multiprocessor system 500 is a point-to-point interconnect system, and includes a first processor 570 and a second processor 580 coupled via a point-to-point interconnect 550. As shown in FIG. 5, each of processors 570 and 580 may be multicore processors, including first and second processor cores (i.e., processor cores 574a and 574b and processor cores 584a and 584b). Note that each of the cores may include private L1 caches. Furthermore, LLCs 575 and 585 may be associated with the cores. In various embodiments, LLCs 575 and 585 may implement classification and associated policies in accordance with an embodiment of the present invention.

First processor 570 further includes point-to-point (P-P) interfaces 576 and 578. Similarly, second processor 580 includes P-P interfaces 586 and 588. As shown in FIG. 5, memory controller hubs (MCH's) 572 and 582 couple the processors to respective memories, namely a memory 532 and a memory 534, which may be portions of main memory (e.g., dynamic random access memory (DRAM)) locally attached to the respective processors.

First processor 570 and second processor 580 may be coupled to a chipset 590 via P-P interconnects 552 and 554, respectively. As shown in FIG. 5, chipset 590 includes P-P interfaces 594 and 598. Furthermore, chipset 590 includes an interface 592 to couple chipset 590 with a high performance graphics engine 538. In one embodiment, an Advanced Graphics Port (AGP) bus 539 may be used to couple graphics engine 538 to chipset 590. AGP bus 539 may conform to the Accelerated Graphics Port Interface Specification, Revision 2.0, published May 4, 1998, by Intel Corporation, Santa Clara, Calif. Alternately, a point-to-point interconnect 539 may couple these components.

In turn, chipset 590 may be coupled to a first bus 516 via an interface 596. In one embodiment, first bus 516 may be a Peripheral Component Interconnect (PCI) bus, as defined by the PCI Local Bus Specification, Production Version, Revision 2.1, dated June 1995 or a bus such as a PCI Express™ bus or another third generation input/output (I/O) interconnect bus, although the scope of the present invention is not so limited.

As shown in FIG. 5, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520. Note that other architectures are possible. For example, instead of the point-to-point architecture of FIG. 5, a system may implement a multi-drop bus or another such architecture.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a shared cache memory having a plurality of portions, each of the portions to store entries, wherein each entry is to include state information for data of the entry, the state information including a sharing indicator to indicate whether one or more private caches coupled to the shared cache memory include a copy of the data, and each entry in the shared cache memory is to further include a first counter field to indicate a number of consecutive accesses to the entry by a requester core and a second counter field to indicate a number of accesses to the entry by different cores; and
a controller coupled to the shared cache memory to analyze the state information of an entry and to automatically determine if the entry includes data of a first type or data of a second type with respect to a location protocol for placement of entries in the shared cache memory.

2. The apparatus of claim 1, wherein each entry is to include a classification indicator field to indicate whether the corresponding entry includes data of the first type or data of the second type.

3. The apparatus of claim 1, further comprising a plurality of pointer structures each associated with one of the portions of the shared cache memory, wherein each pointer structure is to include at least one pointer entry to point to the portion of the shared cache memory in which a requested data element of the first type is located.

4. The apparatus of claim 1, wherein the data of the first type comprises roaming data and the data of the second type comprises non-roaming data, wherein the roaming data is to be stored in a portion of the shared cache memory according to a private location protocol and the non-roaming data is to be stored in a portion of the shared cache memory according to a shared location protocol.

5. The apparatus of claim 1, wherein the shared cache memory is to first search for a data element requested by a first requester unit in a first portion of the shared cache memory, wherein the first portion is the one of the plurality of portions closest to the first requester unit.

6. The apparatus of claim 5, wherein the shared cache memory is to determine if the data element is present in a second portion of the shared cache memory if the data element is not present in the first portion, wherein the second portion is selected for searching based on a shared location protocol.

7. The apparatus of claim 6, wherein the shared cache memory is to determine if the data element is present in a third portion of the shared cache memory, wherein the third portion is selected for searching based on a hit in a pointer structure associated with the second portion.

8. A system comprising:
a first cache having a plurality of portions, each of the portions to store entries, wherein each entry is to include a classification indicator field to indicate whether the corresponding entry includes data stored according to a first location protocol, a first counter field to indicate a number of consecutive accesses to the entry by a requester core and a second counter field to indicate a number of accesses to the entry by different cores; and
a dynamic random access memory (DRAM) coupled to the first cache.

9. The system of claim 8, further comprising a plurality of private caches coupled to the first cache, and wherein a data request is to be first sent to a closest portion of the first cache to a private cache that requests the data.

10. The system of claim 8, wherein the first cache is to update the classification indicator field of an entry including data stored according to the first location protocol based on a change in usage of the data, wherein the first location protocol comprises a private location protocol.

11. The system of claim 10, wherein the update is to indicate that the data is stored according to a second location protocol, wherein the second location protocol comprises a shared location protocol.

12. An apparatus comprising:
a processor including a plurality of cores, each core having a private cache associated therewith, the processor further including a shared cache memory coupled to the private caches, wherein the shared cache memory is segmented into a plurality of portions, each portion located closest to a given one of the plurality of cores, and including a roaming data pointer structure having a plurality of entries each corresponding to a roaming cache line stored in one of the other portions, wherein each cache line in the shared cache memory includes a reuse counter to count consecutive accesses to the cache line by a core and a core counter to count a number of cores that access the cache line.

13. The apparatus of claim 12, wherein the processor further includes a controller coupled to the shared cache memory to analyze state information of a cache line and to automatically determine if the cache line includes data of a first type or data of a second type with respect to a location protocol for placement of entries in the shared cache memory.

14. The apparatus of claim 13, wherein each cache line is to include a classification indicator field to indicate whether the corresponding entry includes data of the first type or data of the second type.

15. The apparatus of claim 14, wherein the data of the first type comprises roaming data and the data of the second type comprises non-roaming data, wherein the roaming data is to be stored in a portion of the shared cache memory according to a private location protocol and the non-roaming data is to be stored in a portion of the shared cache memory according to a shared location protocol.

16. The apparatus of claim 14, wherein the shared cache memory is to first search for a data element requested by a first core in a first portion of the shared cache memory, wherein the first portion is the one of the plurality of portions closest to the first core.

17. The apparatus of claim 16, wherein the shared cache memory is to determine if the data element is present in a second portion of the shared cache memory if the data element is not present in the first portion, wherein the second portion is selected for searching based on a shared location protocol.

18. The apparatus of claim 17, wherein the shared cache memory is to determine if the data element is present in a third portion of the shared cache memory, wherein the third portion is selected for searching based on a hit in a pointer structure of the shared cache memory associated with the second portion.

* * * * *